United States Patent [19]

Bishop et al.

[11] Patent Number: 5,439,317

[45] Date of Patent: Aug. 8, 1995

[54] METHOD OF HANDLING SOLID PARTICLES

[75] Inventors: William M. Bishop, Katy; James D. Grenia, Spring; Donald R. Richner, Houston, all of Tex.

[73] Assignee: PB-KBB Inc., Houston, Tex.

[21] Appl. No.: 958,574

[22] Filed: Oct. 8, 1992

[51] Int. Cl.⁶ .............................................. B09B 1/00
[52] U.S. Cl. ................................. 405/128; 405/258; 405/267
[58] Field of Search ............... 405/128, 129, 258, 263, 405/266, 267

[56] References Cited

U.S. PATENT DOCUMENTS

| | | |
|---|---|---|
| 1,788,706 | 1/1931 | Cross . |
| 2,728,733 | 12/1955 | Hashimoto ........................ 252/449 |
| 3,234,005 | 2/1966 | Smalter et al. ...................... 71/29 |
| 3,779,782 | 12/1973 | Erickson et al. .................... 106/72 |
| 4,044,563 | 8/1977 | Hurst et al. ....................... 405/267 |
| 4,208,217 | 6/1980 | Anderson et al. ................... 106/97 |
| 4,357,167 | 11/1982 | Kellet et al. ...................... 106/97 |
| 4,400,207 | 8/1983 | Tanson ............................ 75/129 |
| 4,432,666 | 2/1984 | Frey et al. ........................ 405/129 |
| 4,463,808 | 8/1984 | Mason et al. ...................... 166/292 |
| 4,696,698 | 9/1987 | Harriett .......................... 405/267 X |
| 4,726,712 | 2/1988 | Sill et al. ........................ 405/263 |
| 4,871,283 | 10/1989 | Wright ............................ 405/263 |
| 4,878,944 | 11/1989 | Rolle et al. ....................... 75/25 |
| 4,916,095 | 4/1990 | Fogler et al. ...................... 502/62 |
| 4,946,311 | 8/1990 | Rosar et al. ....................... 405/129 |

OTHER PUBLICATIONS

Encyclopedia Brittanica Macropedia 15th Ed. (Chicago 1984) (7 pages).

SME Mining Eng. Handbook; Mudd; vol. 1, (3 pages).

*Primary Examiner*—David H. Corbin
*Attorney, Agent, or Firm*—Conley, Rose & Tayon

[57] ABSTRACT

A method of handling solid particles is disclosed, comprising the steps of mixing the solid particles with a clay and water and forming a suspension wherein the solid particles remain suspended. The suspension is transported to an emplacement site.

23 Claims, No Drawings

METHOD OF HANDLING SOLID PARTICLES

TECHNICAL FIELD OF THE INVENTION

The present invention relates to the field of handling solid particles and, more particularly, to a method of suspending solid particles such as mining by-products in a fluid, transporting the fluid to a site and depositing the fluid to such site. Still more particularly, the present invention discloses a method of mixing the solid particles with water and a suitable clay or other additive to produce a fluid wherein the solid particles remain suspended for an extended period of time, and transporting and emplacing said fluid to a site while the solid particles remain suspended in the fluid.

BACKGROUND OF THE INVENTION

It is well known that, in mining operations, minerals in the form of ores are excavated and processed. These operations generate mineral wastes in a powder or course granular form. These wastes, otherwise referred to as tailings, accumulate as large hills near the mine or mineral processing site. Because the tailings are difficult and expensive to handle and transport over either short or long distances, they are generally left above ground permanently.

The large hills of tailings take up valuable surface area, are unsightly, are subject to rapid erosion and are a potential source of wind blown dust and contamination to the soil, ground water or the surface water. Hence, a method of managing the tailings is desired. Because of their mineral nature, the tailings are relatively dense with a specific gravity normally in the range of 2 to 4. Also, the tailings generally have a particle size ranging from a fine powder to coarse gravel.

In the past, mine tailings have been used as backfill for underground cavities or open pits. In backfill operations, only the coarse fraction of the solid waste material, such as tailings, is transported by gravity, pneumatically conveyed or mechanically pumped into the cavity or pit that is desired to be filled. Because dewatering of the placed fill can be a problem, the fine fraction which is comprised of particles which are smaller that 100 mesh is not generally used as backfill. The fill is typically placed and dammed for containment, and, therefore, requires the construction of underground walls, drainage wells, and the like.

Methods are also known for suspending solid particles in a fluid. For example, in the drilling industry, drilling mud is used to carry particles generated by the drilling process up and out of the well. In that application, the drilling fluid or mud is pumped rapidly to suspend the particles in a continuous cycle down the drill pipe and up the outside of the drill string. Upon reaching the surface, the mud is discharged across a screening plant to a holding pond. The smaller solid particles generated at the bit and not caught by the screens settle from the mud and the mud itself is reclaimed and recycled into the well. Because the solid particles drop out quickly at low velocities and the base fluid or mud is recycled, the amount of mud required to transport the particles from the bottom of the well is not critical. Generally, the weight of particles incorporated into the fluid is in the range of about ten to about fifteen percent of the total weight of the fluid. The velocity of drilling mud under normal operating conditions is in the range of from two to four feet per second.

In the transportation and emplacement of mining tailings, however, there may be no surface recovery and recycling of the base fluid. Furthermore, it is not economical or technically feasible to use large amounts of drilling type muds and high velocity to suspend and dispose of large quantities of solids because the cost is high and the emplacement sites are remote. For example, a drilling mud having a specific gravity of 2.7 and made up of lead solids in water with sufficient clay and polymer additives to suspend those solids can cost about $70.00 to about $80.00 per barrel. Such suspension would require smaller than 100 mesh lead, 25 pounds of bentonite per barrel, approximately 3-4 pounds of a suitable polymer per barrel and 2-4 feet per second velocity to maintain it in suspension. Such a mixture is far too expensive for permanent placement underground and the required velocities cannot be maintained in areas distant from the point of release of the mixture.

According to the present invention, a large quantity of solid particles is suspended in a liquid by using a relatively small amount of clay. The solids can be transported and deposited at a point in a cavity or an open pit and allowed to flow over a large area at low velocity, economically and efficiently.

This and other objectives of the present invention will become apparent from the following description.

SUMMARY OF THE INVENTION

The present invention discloses a method for handling solid particles such as mineral waste for the purpose of creating a suspension which can be transported to and/or deposited it in an emplacement site. Large quantities of mineral processing waste is suspended in a mixture by using a relatively small amount of clay. The suspension is prepared by first mixing a suitable clay with water, then mixing the clay/water mixture with a first amount of mineral processing waste to form a base mixture and finally adding a relatively large amount of additional mineral processing waste. The mixture is capable of supporting and transporting in suspension a relatively large mass of mineral processing waste. As a result, the mixture produced can be transported to and distributed over a large area of an emplacement site without premature settlement of the suspended particles.

The nature of the clay used depends on the nature of the water and the mineral processing waste being handled and the availability of the clay at the point of origin of the waste. In situations wherein the water and/or the waste include salt, the preferred clay is attapulgite. In situations wherein salt is not present in either of the two, the preferred clay is bentonite. Furthermore, when the cost of transporting the preferred clay to the point of origin of the waste is high, a clay other than attapulgite or bentonite and which is available from a more proximate source may be used.

DETAILED DESCRIPTION OF THE INVENTION

In general, mine tailings will not suspend in water alone. Similarly, the use of even relatively large quantities of gelling clays does not result in cost effective deployment of tailings in suspensions when the fraction of tailings is low. According to the present invention, a large amount of solid particles such as mine tailings is suspended in a liquid mixture. The nature of the mixture is such that the solid particles remain suspended therein for an extended period of time and the mixture can be transported to and deposited in emplacement sites efficiently and economically before the solid particles settle out of the mixture.

The unique and novel suspension of the present invention is prepared by a three-step process. First, a predetermined amount of a clay is mixed with water to fully hydrate the clay. Then, the hydrated clay is thoroughly mixed with a first amount of the solid particles to be handled to form a base mixture having the first amount of the solid particles suspended therein. Then, a substantially large amount of additional solid particles is added to the base mixture for incorporation and suspension therein. It has been discovered that the initial mixing of the clay with the water and the first amount of solid particles to be suspended has a desirable synergistic effect that enables one to subsequently incorporate and suspend a large amount of solid particles by utilizing substantially less clay than is required in other methods of suspension.

In practicing the method of the present invention, clay is mixed with water, with the amount of clay being about eight to ten pounds of clay per barrel of water. In order to realize the maximum suspending effect of the clay, as disclosed by the present invention, it is essential that the clay be fully hydrated before proceeding with further mixing steps. If the clay is not allowed to hydrate fully, the suspending results will be inferior. The time required for full hydration of the clay in this initial mixing step depends on the volume of the material mixed, the type of the clay, and the degree of saltiness of the water. The viscosity of the resulting clay and water mixture is typically in the order of 3 centipoise.

The water used in the process may be obtained from any source at or near the site where the solid particles are present including, but not limited to, surface or ground water. Depending on the chemical content of the water, some treatment may be necessary to remove undesired ions and the like to maximize the suspending properties of the mixture.

Following hydration of the clay, a first amount of mineral processing waste material is added to the clay/water mixture and is thoroughly mixed therewith. The amount of mineral processing waste is in the range of about 100 to about 200 pounds of waste per barrel of water. It has been found that the addition of this first amount of mineral processing waste to the hydrated clay and water mixture results in a suspension mixture to which a surprisingly large amount of additional mineral processing waste may be added and suspended without adding more clay. Accordingly, an additional amount of mineral processing waste in the range of about 300 to about 700 pounds per barrel of water may be added to the suspension. In most cases, the final suspension includes a weight ratio of clay to solids in the range of about 1:50 to about 1:80. This amount is substantially lower than the amount used in conventional clay suspensions.

The dense mixture comprising clay, water and solid particles is transported to and/or down a shaft and into an underground cavern or a below grade cavity. Because the particles remain suspended and do not settle out of the mixture, when the mixture reaches the floor of the cavern or cavity, it flows laterally and does not accumulate at the point of release. If the particles were not adequately suspended, they would tend to form a hill at the angle of repose of the mineral processing waste in one place, such as below the point of release, thereby ultimately choking off the conveyance or otherwise obstructing the flow of the material to remote areas of the underground or below grade cavity to prevent the filling thereof. The suspension provided according to the present invention makes deployment and depositing of solid particles possible over large areas without the necessity of additional deployment equipment.

The type of clay used in the present invention depends on the nature of the mineral processing waste being handled and the chemical composition of the water used. If the water has a low concentration of salt ions or if the mineral processing waste does not include a significant amount of salt, the preferred clay is bentonite. Examples of mineral processing wastes with negligible amount of salt include, but are not limited to, lead, zinc and iron.

Bentonite is naturally available in near pure form in parts of Montana and Wyoming. Other bentonite-type clays occur naturally in several areas in the United States. Bentonite is a plastic, colloidal clay which is largely made up of the mineral sodium montmorillonite, a hydrated aluminum silicate. The generic term "bentonite" is not an exact mineralogical name and the clay referred to as "bentonite" is not of definite mineralogical composition. The structure of montmorillonite may be characterized as a thin plate-type sheet with indefinite width and breadth, and a thickness of one molecule. The unit thickness of the molecule consists of three layers, with a layer of silica sandwiched between two layers of alumina. Replaceable ions are attracted to the surface of the molecule and are responsible for the hydrophilic properties of the clay.

If the water used or the mineral processing waste being handled contains a significant amount of salt, the preferred clay to be used, in accordance with the present invention, is attapulgite. Unlike bentonite, which does not exhibit sufficient gelling properties in the presence of salt, the hydration of attapulgite is not affected by the presence of salts; instead, when used in the presence of brine, attapulgite exhibits a gelling ability similar to that of bentonite in water and mineral processing waste having low salt concentration. Attapulgite, a hydrous aluminum silicate, is a colloidal, viscosity building clay. It is used, in accordance with the present invention, in applications wherein saturated salt brine is used with a salt containing mineral waste because its straw-like molecular structure is not affected by sodium and chloride ions.

In general, a salt-free system is preferred, if practical, because such system is not as corrosive as a salt-containing system. Furthermore, such system is preferred because bentonite, which is used with such system, tends to be less expensive than attapulgite. Therefore, in situations wherein the mineral waste includes a negligible amount of salt but the available water contains salt, it may be more economical to remove the salt from the water so that the cheaper bentonite can be used.

It should be understood that, although bentonite or attapulgite is the preferred clay to be used depending on the salt content of the system, other clays may also be used, if they are more readily available or economical due to proximity or other factors. These clays, however, may have a lower capacity to suspend and carry waste.

Particle size can also affect the suspendability of mineral processing wastes. For example, small particles suspend better than large particles, and very fine particles suspend so well that the mixture may become too thick to transport by pump or similar means. The distribution of mineral processing waste sizes is also important, as waste which contains particles which span a wide range of sizes is more easily suspended than waste wherein the particles are of about the same size. Therefore, it may be preferred to screen the waste particles prior to applying the present method to scalp off the particles that are too large to suspend to obtain a better particle size distribution. Generally, the presence of some 250 mesh or smaller particles greatly enhances the suspendability of the waste.

The viscosity of the mixture increases as the amount of suspended solids is increased. The practical upper limit on the amount of solids that can be incorporated, however, is not necessarily determined by the viscosity of the mixture, but by the suspendability of the particles. More particularly, when the amount of solids is increased above about 600–700 pounds per barrel of water, additional solids can no longer be suspended; instead, they begin to settle out of the mixture. At that level of solid content, the mixture may still be pumpable.

Since a principal objective is to provide a means for transporting mineral processing waste to an emplacement destination, it is desired that the mixture supporting a maximum amount of solid particles not settle for at least the minimum time period required to transport the waste prior to emplacement. This period may be on the order of hours to days. Therefore, it is necessary that the particles remain suspended for relatively long periods without undergoing appreciable settling. It has been found that, in addition to being capable of incorporating and maintaining in suspension a large amount of mineral waste, a mixture made according to the above method exhibits minimal settling at zero velocity, over extended periods.

The suspension mixture of the present invention exhibits the rheological behavior of a Bingham fluid. This means that the relation between shear stress and velocity is substantially linear with a minimum threshold shear stress below which no motion occurs.

The above method for suspending solids has many applications. The main application is the one wherein it is used to transport and emplace mineral processing waste in underground caverns or below grade cavities. Another application is for backfilling of open pits or quarries without the use of costly and labor intensive equipment for deployment. Additionally, the method can be used to emplace clay or other liners in holding or storage ponds that are used to hold liquids and to prevent the entry of these liquids into the ground water regime and/or to emplace liners in landfills for a similar purpose. Another application of the method, is for the extinguishment and/or containment of coal mine fires by deploying quantities of solids below ground to seal the fire from sources of oxygen. Still another application of the method is to emplace solids in previously mined cavities to prevent surface subsidence.

It should be noted that, when the mineral processing waste includes clay, the method of the present invention of forming a suspension and emplacing the suspension in an emplacement site can be used. In that case, the waste is mixed with water to form a suspension wherein the solids are maintained in suspension for a sufficient period of time to transport the suspension to, and to dispose it over a large area of a site, as taught by the present invention.

In the event it is desirable to remove the water from suspension following its emplacement in a site, a dewetting agent may be used to remove the water from the suspension. In that case, the water is removed and may be reused. Thinners may also be used to cause the suspended particles to fall out of suspension following the emplacement. When water is removed from the suspension, the suspension becomes less permeable, an event which constitutes an environmental enhancement. With the use of additives, the permeability of the suspension may be increased or decreased according to need.

The following examples further illustrate the invention but are not to be construed as limitation of the invention contemplated herein. In every example, the tailings were added to the suspension in increments of 280 kg/m³ (100 lb/bbl). They include the results of tests on the suspendability of various sizes and types of mineral processing waste. Table I lists the particle size distribution for each type of waste.

TABLE I

| | Approximate Weight Percent Per Sieve Grade | | | | | | | |
|---|---|---|---|---|---|---|---|---|
| | SIEVE GRADE (Mesh) | | | | | | | |
| TAILING SOURCE* | 5 | 9 | 16 | 32 | 60 | 115 | 250 | −250 |
| Spindletop Tailing - Salt (One Pass Through Crusher) | 0 | 8 | 42 | 20 | 13 | 8 | 4 | 4 |
| Pilot Knob - Iron | 1 | 14 | 24 | 26 | 20 | 10 | 2 | 3 |
| Noss Plant Waste - Sand & Shale | 30 | 27 | 19 | 13 | 5 | 3 | 2 | 2 |
| LaMotte Mine - Lead & Zinc | 10 | 19 | 13 | 11 | 20 | 15 | 6 | 5 |
| Pitcher Mine - Zinc | 37 | 33 | 11 | 8 | 3 | 2 | 1 | 4 |
| Viburnum Mine - Lead and Zinc | .2 | .9 | .8 | 2 | 29 | 35 | 12 | 20 |

*The substances listed after each source site are the minerals recovered from the mined ore. The tailings comprise the waste materials generated by the recovery process.

EXAMPLE 1

Viburnum Mine Tailing Test

Tailings from the Viburnum mine, comprising a dolomite and limestone mixture with a specific gravity of 3.1, from which tailings larger than nine mesh had been removed were mixed with bentonite and tap water in varying combinations. When 50 to 55 kg/m³ of bentonite were mixed with tap water, the mixture could suspend only 570 kg/m³ of tailings. When only 28.5 kg/m³ of bentonite were used with a minimum first amount of 1426.5 kg/m³ of tailings, synergistic suspension occurred. Additional tailings were added and remained suspended until the viscosity became too high to measure. The addition of quebracho, a conventional thinner, resulted in an immediate reduction in viscosity, and caused the tailings to fall out of suspension.

EXAMPLE 2

Noss Plant Waste Tailing Test

Tailings from the Noss Plant Waste, comprising a sand and shale mixture with a specific gravity of 1.5, from which the tailings larger than nine mesh had been removed, were used. The tailings were added to 28.5 kg/m$^3$ of bentonite mixed in tap water. Synergistic suspension occurred at 1141.2 kg/m$^3$. A second test was run using 11.4 kg/m$^3$ of bentonite hydrated in tap water. Synergistic suspension occurred at 1426 kg/m$^3$ of tailings. Other tests were run, in which the amount of bentonite was varied. In all instances, approximately 2000 kg/m$^3$ of tailings was the maximum amount which could be added. At this level, all of the liquid phase was absorbed and mixing became difficult. Finally, a test was run using tap water and tailings in the absence of bentonite. Suspension occurred at 1426 kg/m$^3$ of tailings and the mix was still pourable at 2000 kg/m$^3$ of tailings. The mix became to viscous to pour, however, at tailing levels above this amount. It is believed that Noss Plant Waste tailings suspend themselves in water without the addition of bentonite because there are some naturally occurring clays in these particular mine wastes which make it unnecessary to add a gelling clay. Suspension is also probably aided by the low specific gravity of the tailings.

EXAMPLE 3

Pitcher Mine Tailing Test

Tailings from the Pitcher Mine, comprising dolomite, limestone, and chert, with a specific gravity of 2.8, from which particles larger than nine mesh had been removed, were used. Using 28.5 kg/m$^3$ of bentonite hydrated in tap water, these tailings showed synergistic suspension and pumpability when added in amounts ranging from 1712 kg/m$^3$ to about 2853 kg/m$^3$. When the mix was agitated, some settling out of the solid particles occurred. When 22.8 kg/m$^3$ of bentonite were used, tailings showed synergistic suspension when added in amounts ranging from 1797 kg/m$^3$ to approximately 3138 kg/m$^3$, however, at this upper end of the range, the mixture was extremely viscous.

EXAMPLE 4

Mine La Motte Tailing Test

Mine La Motte tailings comprise dolomite and limestone from which lead and zinc have been extracted. The tailings have a specific gravity of 3.0. Before the test, tailings larger than nine mesh were removed. Using 22.8 kg/m$^3$ of bentonite, synergistic suspension occurred when tailings were added in amounts ranging from about 2280 kg/m$^3$ to about 2853 kg/m$^3$.

EXAMPLE 5

Pilot Knob Tailing Test

Pilot Knob mine tailings comprise porphyry rocks having a specific gravity of 2.9. Before the test, particles larger than nine mesh were removed. At 22.8 kg/m$^3$ of bentonite hydrated in water, the mix could not suspend until approximately 2850 kg/m$^3$ of tailings had been added. At this level, a small amount of agitation caused the particles to fall out of suspension. A second test was run using 34.2 kg/m$^3$ of bentonite. Synergistic suspension occurred when tailings were added in amounts ranging from about 2280 kg/m$^3$ to about 3138 kg/m$^3$.

EXAMPLE 6

Spindletop Mine Tailings Test

Spindletop tailings comprise rock salt having a specific gravity of 2.165. Prior to testing, the tailings had to be crushed, since most of the pieces were otherwise too large to be suspended, i.e., +9 mesh. Following crushing, the tailings were sorted by size and suspendability was checked for each size range. It is believed that the variation in suspendability that is attributable to particle size is relevant for non-reactive tailing substances as well. An attempt to hydrate bentonite in salt water was a complete failure. Likewise, an attempt to add salt tailings to a prehydrated fresh water bentonite gel failed as the salt dissolved in the water. Instead, attapulgite was added to a saturated brine (1078 kg/m$^3$) solution. Using 28.5 kg/m$^3$ attapulgite in the saturated brine, tailing sizes and various ranges were tested. The results are produced in Table II below.

TABLE II

Suspendability of Salt Tailings in a Mixture of 28.5 kg/m$^3$ Attapulgite in 1200 kg/m$^3$ Saturated Salt Solution

| Mesh Size | Minimum Solids Required for Suspension kg/m$^3$ | Maximum Solids Suspendable kg/m$^3$ |
| --- | --- | --- |
| 8–10 | — | not suspendable |
| 10–14 | 1710 | 2570 |
| 14–20 | 1710 | 2570 |
| 20–28 | 1425 | 2280 |
| 28–35 | 1425 | 2280 |
| −35 | 855 | 1200 |

While a preferred embodiment of the invention has been shown and described, modifications thereof can be made by one skilled in the art without departing from the spirit of the invention.

What is claimed is:

1. A method of suspending solid mineral particles, consisting essentially of the steps of:
   adding a suitable clay to water to form a water/clay mixture;
   mixing a first amount of the solid mineral particles with the water/clay mixture to form a base mixture, the first amount of solid mineral particles being greater than an amount of solid particles that could be suspended in the water/clay mixture; and
   mixing an additional amount of the solid mineral particles with the base mixture, to form a final suspension that includes a total amount of solid particles, said total amount of solid particles being fully suspended in the final suspension such that said total amount remains substantially suspended in the absence of agitation.

2. The method according to claim 1 further including the step of hydrating the clay.

3. The method according to claim 1, wherein the solid mineral particles are mineral processing waste.

4. The method according to claim 1, further including the step of forming a pumpable, flowable suspension wherein said total amount of the solid mineral particles remains suspended and the suspension remains pumpable and flowable for at least eight hours.

5. The method according to claim 1, wherein the water or the solid particles contain salt and the clay is attapulgite.

6. The method according to claim 1 wherein the clay is bentonite and the water contains less than 50,000 parts per million of sodium chloride ions.

7. The method according to claim 1 wherein the clay is attapulgite and the water contains more than 50,000 parts per million sodium chloride ions.

8. The method according to claim 1 wherein the water/clay mixture includes about 8 to 10 pounds of clay per barrel of water.

9. The method according to claim 8 wherein said first amount of solid particles is in the range of about 100 to about 200 pounds of solid particles per barrel of water.

10. The method according to claim 9 wherein said additional amount of solid particles is in the range of about 300 to about 700 pounds per barrel of water.

11. The method according to claim 1 further including the step of forming a suspension having the characteristics of a Bingham fluid.

12. A composition, comprising:
between 0 and 28.5kg/m$^3$ of a clay; water; and
at least 1426.5 kg/m$^3$ of a mineral processing waste, the composition forming a pumpable, flowable suspension wherein the mineral processing waste is suspended.

13. The composition of claim 12 wherein the suspension has the characteristics of a Bingham fluid.

14. A method of handling solid particles, comprising the steps of:
mixing some solid particles with a clay and water; and
forming a pumpable, flowable suspension by:
adding an additional amount of solid particles to produce a total amount of solid particles such that an amount less than said total amount cannot be fully suspended in said clay and water,
wherein substantially all of the solid particles remain suspended for a period of at least eight hours.

15. The method of claim 14 further including the step of transporting the suspension to an emplacement site while the particles remain substantially suspended in the suspension.

16. The method of claim 14 further including the step of depositing the suspension in an emplacement site while the particles remain in suspension.

17. The method of claim 14 further including the step of adding a thinner to cause the particles to fall out of suspension.

18. The method according to claim 14 further including the step of adding the clay to the water prior to the mixing step.

19. The method according to claim 14 wherein the weight ratio of said clay to said solid particles is less than 1:10.

20. The method according to claim 14 wherein the weight ratio of said clay to said solid particles is less than 1:50.

21. A method of handling mineral processing waste containing clay, comprising the steps of:
mixing a synergistic amount of the waste with water;
forming a pumpable suspension wherein the waste remains suspended for a period of at least 8 hours;
depositing the suspension in an underground cavity at an emplacement site; and
allowing the suspension to flow laterally from the emplacement site without substantial settling, whereby a large volume of suspension can be placed underground.

22. A method of handling solid particles, comprising the steps of:
mixing the solid particles with an amount of clay and water; and
forming a pumpable, flowable suspension wherein the solid particles remain substantially suspended and said suspension remains pumpable and flowable for a period of at least eight hours, the suspension containing at least a minimum amount of solid particles, such that smaller amounts of solid particles would not be suspendable using said amount of clay.

23. A method of disposing of solid particles, comprising the steps of:
adding a suitable clay to water to form a water/clay mixture;
mixing an amount of solid particles with the water/clay mixture to form a pumpable, flowable suspension in which the solid particles are capable of remaining suspended in the absence of turbulence; and
deploying the suspension at an emplacement site by allowing it to flow by gravity over the area of the site.

* * * * *